April 10, 1945.   W. A. DUFFIELD   2,373,234
VARIABLE SPEED TRANSMISSION
Filed March 25, 1942   3 Sheets-Sheet 1

INVENTOR.
WILLIAM A. DUFFIELD,
BY Hood Hahn
ATTORNEYS.

April 10, 1945. W. A. DUFFIELD 2,373,234
VARIABLE SPEED TRANSMISSION
Filed March 25, 1942 3 Sheets-Sheet 2

INVENTOR.
WILLIAM A. DUFFIELD,
BY: Hood & Hahn
ATTORNEYS

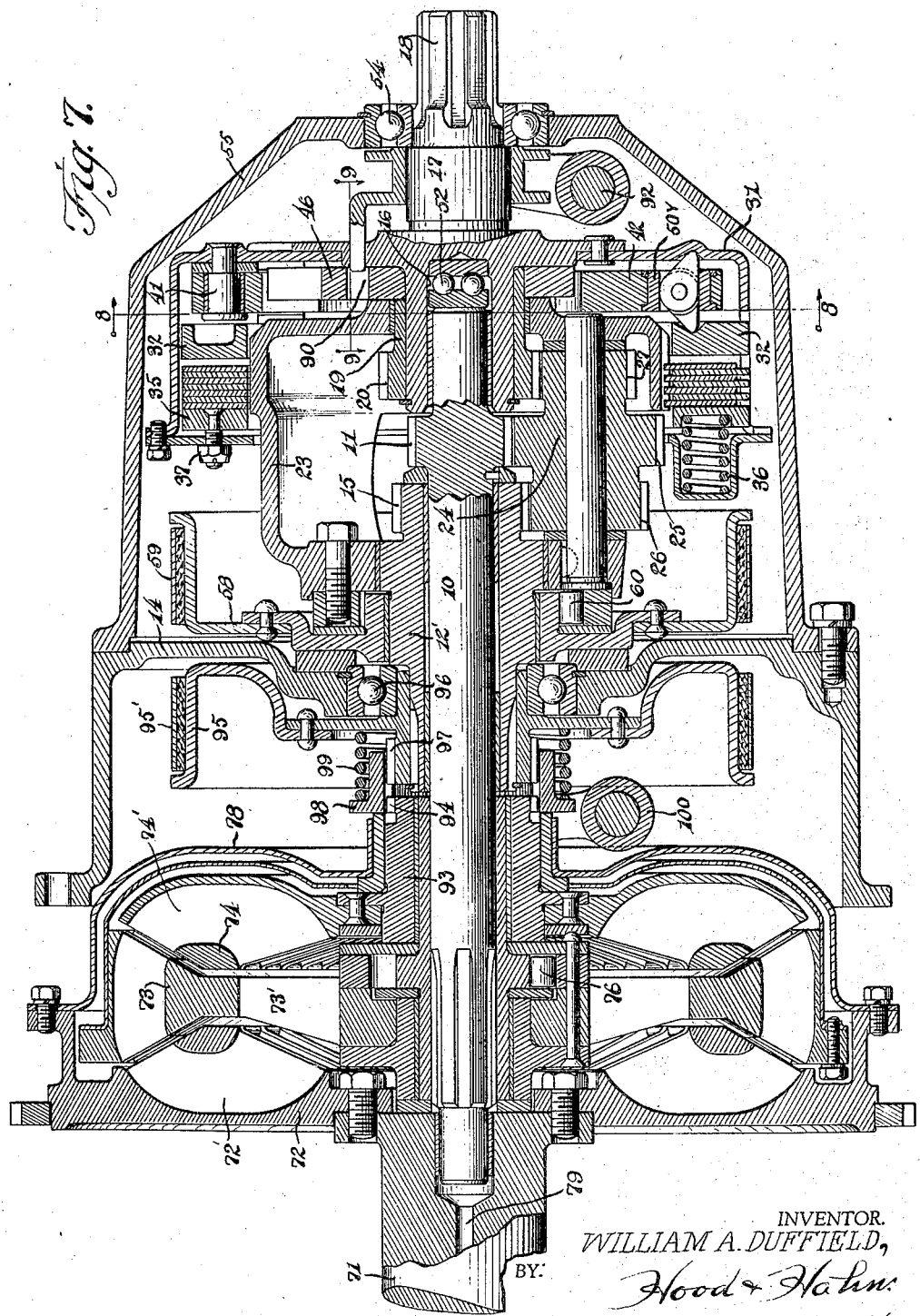

Patented Apr. 10, 1945

2,373,234

UNITED STATES PATENT OFFICE 2,373,234

VARIABLE-SPEED TRANSMISSION

William A. Duffield, Windsor, Ontario, Canada, assignor to Windfields Limited, Montreal, Quebec, Canada, a corporation of Canada Application March 25, 1942, Serial No. 436,159

27 Claims. (Cl. 74—189.5)

This application is in part a continuation of my pending application Serial No. 310,845, filed December 23, 1939, for Variable speed transmission.

This invention relates to a mechanism for the transmission of power from a prime mover to a delivery shaft at variable speeds in such manner that the shifts from one speed ratio to another are entirely automatic in accordance with the relation between the prime mover torque and the delivery-shaft torque.

The mechanism includes a liquid coupling mechanism which cooperates with the gearing in a novel manner.

The primary object of the invention is to provide a speed-change transmission gearing which will meet the varied requirements of load, speed and torque, particularly in the operation of motor vehicles.

A further object of the invention is to provide a transmission in which the changes of speed and torque are not manually controlled but are automatic and are subject to the control of the power supplied to the transmission and the resistance of the load at any load speed.

Figure 1:
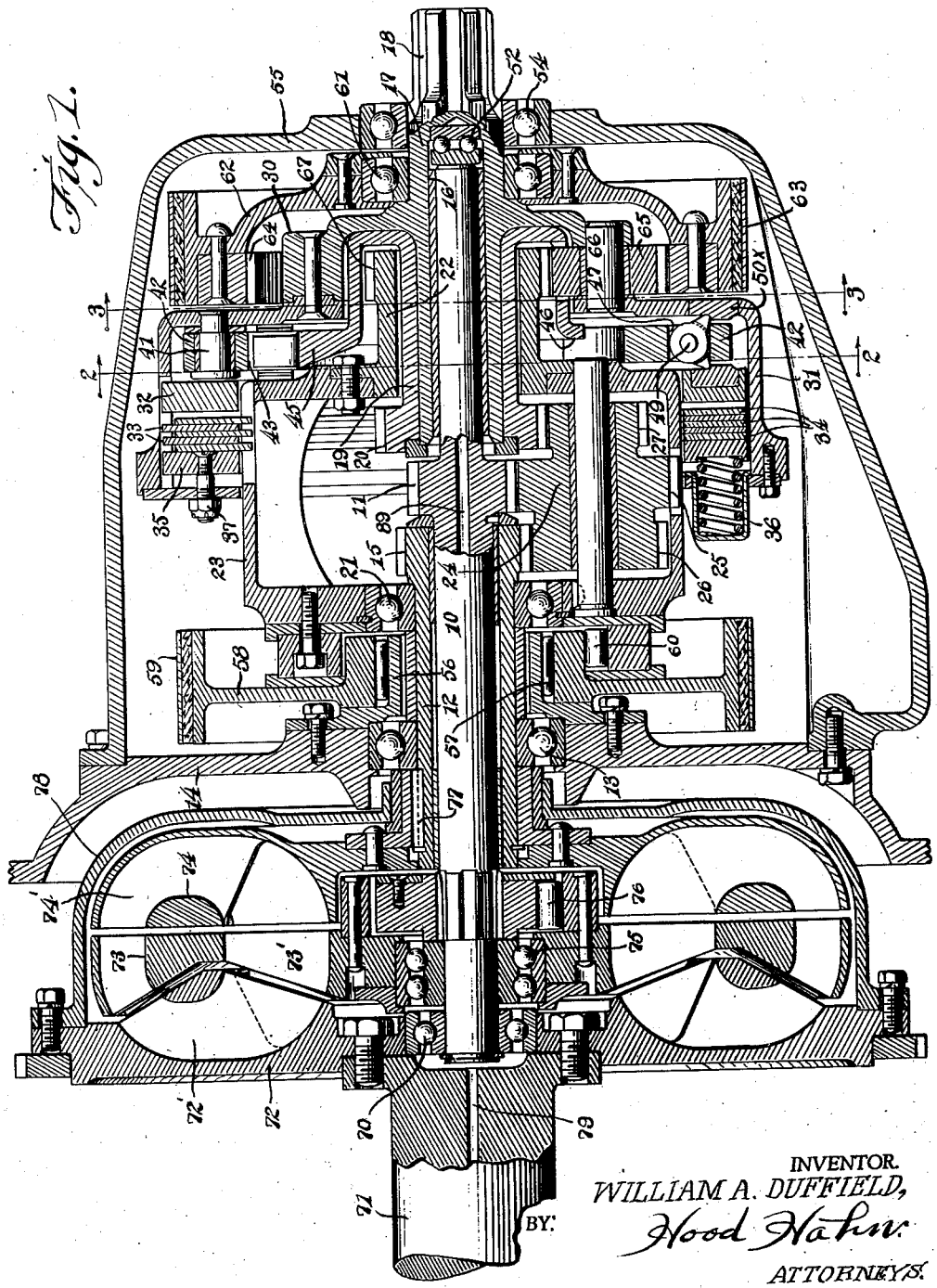
Figure 2:
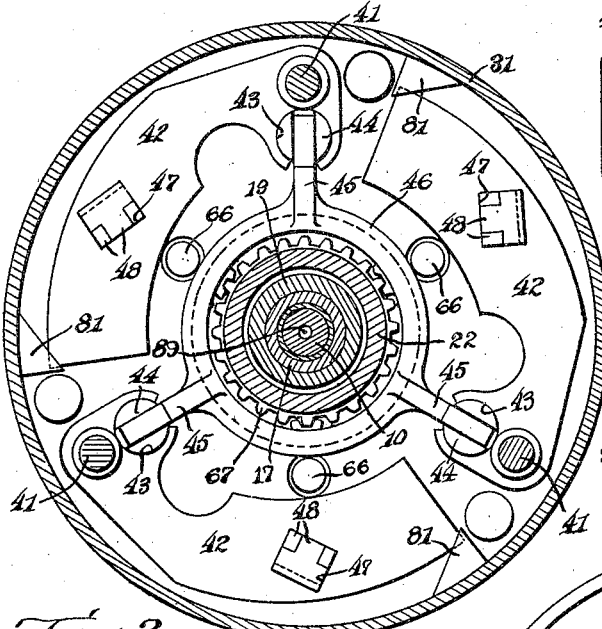
Figure 6:
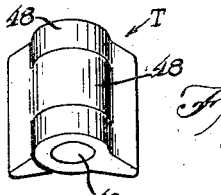
Figure 4:
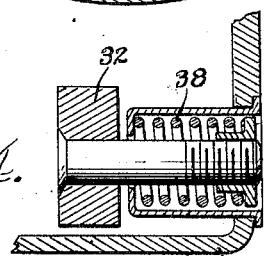
Figure 3:
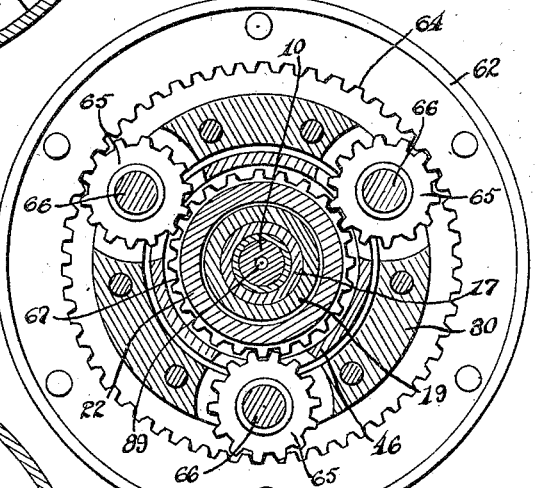
Figure 8:
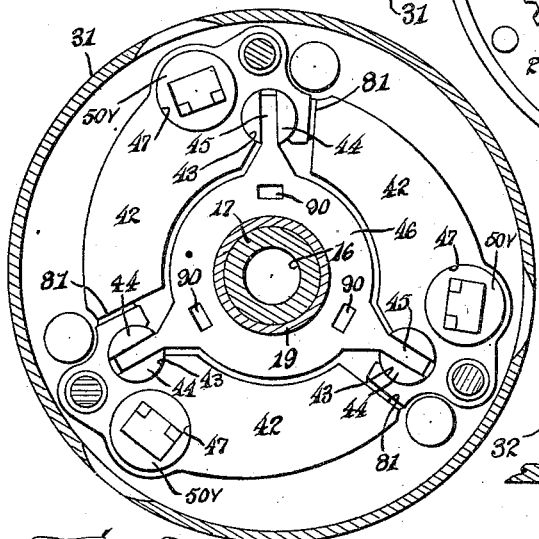
Figure 5:
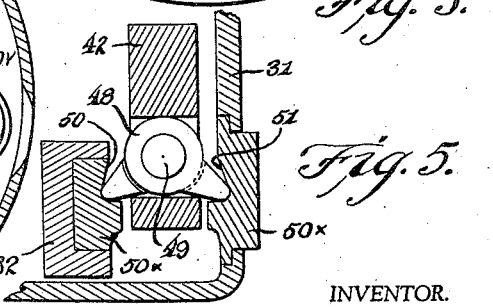

The accompanying drawings illustrate my invention:

Fig. 1 is an axial section of one embodiment of my invention;

Fig. 2 a section on line 2—2 of Fig. 1 on a reduced scale;

Fig. 3 is a section on line 3—3 of Fig. 1;

Fig. 4 a fragmentary detail of the mounting of the pressure plate of the clutch between the tail shaft and the planetary gear carrier;

Fig. 5 an enlarged detail of the toggle mechanism operated by the centrifugally responsive actuator of said clutch;

Fig. 6 a perspective view of said toggle;

Fig. 7 an axial section of another embodiment of my invention;

Fig. 8 a section on line 8—8 of Fig. 7; and

Figure 9:
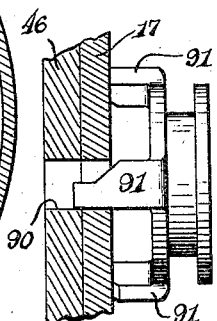

Fig. 9 a fragmentary section on line 9—9 of Fig. 7.

Referring first to Figs. 1 to 6 inclusive, 10 indicates the main shaft of the transmission, and this shaft is provided with a sun gear 11. Journalled upon shaft 10 is a tubular shaft 12 which is supported in a bearing 13 supported by the stationary end wall 14. Shaft 12 carries a sun gear 15 which flanks gear 11. The outer end of shaft 10 is journalled in an axial pocket 16 formed in the inner end of tail shaft 17 which, at its outer end, is splined or otherwise formed at 18 to receive a coupling which is connected to the load. Journalled on the inner end of tail shaft 17 is a tubular shaft 19 provided at its inner end with a sun gear 20 which flanks gear 11 on the side opposite to gear 15.

Journalled on the two tubular shafts 12 and 19, through the medium of bearing 21 and tubular shaft 22 respectively, is a planetary gear carrier 23 within which is journalled a planetary gear group 24 comprising, a gear 25 meshing with gear 11, a gear 26 meshing with gear 15, and a gear 27 meshing with gear 20. In the embodiment shown gear 11 is smaller than gear 15, gear 15 is smaller than gear 20, and gears 25, 26, and 27 of the planetary gear group are appropriately dimensioned so as to be in simultaneous engagement with the sun gears.

Connected to, or formed integrally with, tail shaft 17 is a flange 30 to which is attached a clutch housing 31 within which is splined a pressure ring 32 and a plurality of friction rings 33 interdigitated with a plurality of friction rings 34 splined upon carrier 23. Flanking the group of friction rings 33—34 is a pressure ring 35 which is splined on clutch housing 31 and yieldingly urged toward the friction rings by springs 36, the action of which is limited by adjusting nuts 37. Pressure ring 32 is yieldingly urged away from the adjacent friction ring group by springs 38 (Fig. 4).

In the interior of the clutch housing 31, which, as noted above, is connected to the tail shaft for rotation therewith, is a series of pins 41 upon each of which is pivoted a centrifugally sensitive weight 42 conveniently in the form of a bell crank lever, the long arm of which is appropriately weighted and the short arm of which is provided with a cylindrical pocket 43 within which is journalled a bushing 44 which is diametrically slotted to receive an arm 45 projecting radially from a ring 46 formed integrally with, or attached to, tubular shaft 19.

The weighted arm of each of the elements 42 is provided with a perforation or pocket 47 within which is located a toggle structure T composed of two members 48—48 pivotally connected by a pivot pin 49 and each provided with a toe, one of which rests in a pocket 50 in the pressure ring 32 and the other of which rests in a pocket 51 of housing 31, the arrangement being such that when the weighted end of the centrifugally sensitive element 42 moves outwardly under the action of centrifugal force, the toggle structure will be expanded between housing 31 and pressure ring 32 to force said pressure ring 32 toward pressure ring 35 and the interposed friction rings so as to activate the clutch and thereby connect housing 31 and tail shaft 17 with carrier 23.

A thrust bearing 52 is inserted between the outer end of tail shaft 10 and the bottom of pocket 16 of the tail shaft and the tail shaft is journalled in the bearing 54 carried by casing 55 which is attached to end wall 14 and encloses the epicyclic gearing which has been described.

Attached to end wall 14 is a sleeve 56 through which tubular shaft 12 projects and which supports bearing 57 upon which is journalled a brake drum 58 which may be held stationary by manually operated brake 59. Interposed between the hub of drum 58 and carrier 23 is a one-way clutch 60 which will prevent reverse rotation of carrier 23 when drum 58 is held stationary.

Journalled on the tail shaft through the medium of bearing 61 within casing 55 is a brake drum 62 which may be held stationary by manually operated brake 63. Drum 62 carries an internal gear 64 which meshes with a circular series of pinions 65 each journalled on a pin 66 carried by flange 30 and meshing with a gear 67 carried by shaft 22 attached to carrier 23.

The power-receiving end of shaft 10 is supported by a bearing 70 supported by the delivery end of the drive shaft 71 connected with the motor and attached to this shaft is the impeller element 72 of a liquid coupling which includes a first runner 73 and a second runner 74, said impeller and runners being provided respectively with circular series of fluid passages 72', 73', 74' formed by radiating vanes in the manner of the so-called "Fottinger" type of liquid couplings. Runner 73 is journalled on a bearing 75 carried by shaft 10 and interposed between said runner and shaft 10 is a one-way clutch 76 which will permit independent forward rotation of shaft 10 relative to runner 73. Runner 74 is keyed at 77 to tubular shaft 12. Carried by impeller 72 is a shell 78 which encases the two runners 73 and 74.

The cavities of impeller 72 and runners 73 and 74 are filled with a suitable liquid, conveniently lubricating oil, conveniently supplied through a passage 79 through the drive shaft and distributable through passages 89 in shaft 10 to various points in the gearing.

The operation is as follows:

With brakes 59 and 63 in inactive position, power applied to the drive shaft will be ineffective to cause rotation of tail shaft 17.

For low speed, brake 59 is applied to hold drum 58 stationary. Rotation of impeller 72 causes a circulation of coupling liquid through the passages of the impeller and runners and exerts a forward drag on runner 73 which, in turn, exerts a lesser forward drag on runner 74. The forward movement of runner 73, through the medium of the one-way clutch 76, rotates gear 11 which, in turn, rotates the planetary group 24, reverse revolution of which is prevented by clutch 60 against the stationary drum 58, but rotation of which causes forward rotation of gear 20 with its shaft 19 and ring 46, the fingers 45 of which act upon the short arms of the centrifugal weights 42 to urge them to their innermost position against stops 81 so that a driving effort is exerted on pins 41 to rotate casing 31, and therefore flange 30 and tail shaft 17, forwardly. At the same time, rotation of the planetary unit 24 through the medium of gears 26 and 15 rotates runner 74 forwardly but at a lesser speed than runner 73.

Second forward speed: As the load resistance decreases, with or without variation of load speed, the driving effort exerted by runner 73 on runner 74 becomes sufficient to permit gear 15 to exert a forward driving effect on the planetary unit 24 so that the driving effort is then transmitted to the tail shaft through the medium of gears 15, 26, 27, and 20, and the speed-sensitive elements, as in low gear, to the tail shaft.

High speed forward: As the forward speed of the load further increases, or the resistance torque decreases, there comes a time when the centrifugal forces acting on the speed-sensitive elements 42 will start the weighted ends of said elements outwardly and, acting through the toggle T, will bring pressure ring 32 into engagement with the friction rings 33. Prior to initial outward movement of weights 42, gear 25, acting on gear 11, is causing shaft 10 to rotate forwardly relative to runner 73 at a speed differential determined by the ratios of gears 15—26 and 24—11, but when carrier 23 starts forwardly this speed differential is lessened by the forward speed of carrier 23 and there comes a time therefore when shaft 10 no longer underruns runner 73 so that clutch 76 becomes effective on shaft 10 and consequently the engine torque, instead of being transmitted through runner 74 to the tail shaft, will be transmitted through runner 73 and shaft 10 and the low speed train, so that the load torque impressed upon the speed sensitive elements is opposed by the engine torque arriving through the low speed gearing and consequently the outward movement of the speed-sensitive elements to complete firm and final connection between carriers 23 and 31 is slightly delayed, but ultimately, provided the load torque is not too great, connection between the carriers 23 and 31 will be fully established and the engine torque will be applied to the tail shaft through the medium of the runner 73 and the low speed train of gears, although there will be no relative rotation between gears 11 and 20 because planetary movement of the planetary unit 24 is permitted because of the locking together of the carriers 23 and 31. Whenever the load resistance sufficiently increases relative to the arriving engine torque the reduced speed of carrier 31 permits the speed-sensitive elements to move inwardly thereby first permitting slippage in clutch 33 so that there is a transfer of engine torque from runner 73 to runner 74 and thence to the tail shaft through the second speed gearing or, if necessary, complete inactivity of clutch 33 and a consequent shift of engine torque from runner 74 to runner 73 and thence to the tail shaft through the low speed gearing, carrier 23 being at that time stationary and held against reverse rotation by clutch 60.

Reverse rotation is obtained by releasing brake 59 and bringing brake 63 into engagement with drum 62 thus holding gear 64 stationary. In this relation of parts, power arrives from impeller 72, through runner 73, shaft 10, and gear 11. Rotation of gear 20 is resisted by the load on the tail shaft and therefore rotation of gear 27 on gear 20 causes carrier 23 to rotate reversely and, acting through gears 67 and 65 against stationary gear 64, operates to rotate the tail shaft in reverse direction.

Referring now to Fig. 7: In the main this mechanism is like the apparatus shown in Fig. 1 and similar parts are similarly designated so that detailed description is not necessary. Instead of the reverse mechanism shown in Fig. 1, I have provided block-out means to block the speed-sensitive elements from response to speed changes; means to disconnect the second sun gear from the second runner of the coupling; and means to hold the second sun gear stationary. Ring 46 is provided with one or more perforations 90 into each of which is projectible a finger 91 splined on the tail shaft and shiftable axially by manual means 92. Finger 91 and perforation 90 are so formed, as shown in Fig. 9, that when finger 91 is in retracted position ring 46 may have a limited rotative movement relative to the tail shaft, so as to permit centrifugal movements of elements 42, and when finger 91 is projected fully into perforation 90 such relative rotating movement is blocked thus blocking elements 42. Runner 74 of the coupling is provided with a hub 93 journalled on shaft 10 and provided at its outer end with a jaw clutch element 94. The sun gear 15 is carried by a tubular shaft 12', to the outer end of which is secured a brake drum 95 which is supported by bearing 96 comparable with bearing 13 in the other form. Coacting with drum 95 is a brake band 95' by means of which the drum 95 may be held stationary. The hub of drum 95 is provided with a jaw clutch element 97 upon which is splined a jaw clutch element 98 capable of interdenting with jaw clutch element 94 and normally urged to that position by spring 99. Element 98 may be shifted so as to disestablish driving relation between runner 74 and tubular shaft 12' by a manually controlled lever 100. To obtain reverse rotation in this device, finger 91 is shifted to blocking position relative to ring 46, thus blocking the speed sensitive elements against response to speed variations; clutch 98 is shifted to disestablish driving connection between runner 74 and gear 15, and gear 15 is held stationary by brake 95'. In this relation of the parts power flows from the motor through impeller 72 to runner 73 through clutch 76 to shaft 10, gear 11, and gear 25, causing gear 26 to roll around the fixed gear 15, thus rotating carrier 23 in a reverse direction and causing gear 27 to rotate gear 20 in a reverse direction, carrying with it ring 46, fingers 91, and the tail shaft 17 in a reverse direction.

The primary function of clutch 98 is to hold sun gear 15 stationary for reverse drive. Disengagement of this clutch from runner 74 is not essential, because, with the gear 15 held stationary, reverse drive will result even though runner 74 be held against rotation. Under such circumstances some drag will be set up between runner 73 and the stationary runner 74 which would probably reduce possible reverse drive speed but, for ordinary reverse operation, this resistant does not appear to be greatly noticeable.

The clutch 32—35, between carrier 23 and the tail shaft, must be of a type which, in its initial activation, will to some extent permit relative slippage between carrier 23 and the tail shaft. A friction clutch such as shown is, so far as I know, the most efficient form of clutch for this purpose but, in using the term "friction clutch" in the appended claims, I wish it to be understood that any type of clutching mechanism which will permit restrained relative rotation between carrier 23 and the tail shaft at the time of initiation of activation of the clutching means, may be considered as a proper equivalent.

I wish it also understood that instead of the band brake 58—59, some other type of means for automatically blocking reverse rotation of the carrier 23 under forward speed conditions and for permitting reverse rotation of said carrier for reverse conditions, might be substituted and the term "band controlled brake drum" found in some of the claims is to be interpreted with that in view. The same is true as to parts 62—63.

It will, of course, be understood that for practical purposes there will be several (conveniently 3) planetary groups 24 to properly balance the epicyclic gearing.

It will be noted that the governor weights 42 are not controlled by speed of the tail shaft alone but by a combination of that speed and the resistance torque, and that the higher the load torque, the higher will be the speed of the tail shaft necessary to cause those weights to activate the coupling between carrier 23 and the tail shaft. The action of this coupling may, therefore, be termed torque responsive. For example, should the car be called upon to accelerate rapidly under high resistance torque (as in ascending a heavy grade), a higher load speed would be attained in the second gear ratio before automatic shift into high gear, than would be the case if the load torque were less, in which case the shift from second to high would occur at a lower load speed. This is because, in the first instance, the speed-sensitive elements 42 are restrained by the load from activating the clutch 32—35 until the higher load speed is attained. It will be noted, of course, that the concurrent engagement of the fingers 45 with all of the speed-sensitive elements 42 serves to synchronize the centrifugal response of the elements 42 so that temporary unbalance is prevented.

The toggle 48 is so proportioned that even when weights 42 are in their outermost position, the axis of the toggle lies short of dead center and therefore the retrieving springs 38 constantly act on pressure ring 32 urging weights 42 toward their inner position, so that inward positioning of the weights when the apparatus is at rest is assured.

As the weights 42 swing there is a change of the angular relation of toggles T relative to their abutment pockets 50 and 51 and compensation for this change may be provided by forming the pockets in rotation blocks 50x, as shown in Fig. 1, or by journalling the toggles in rotation blocks 50y, as shown in Fig. 7.

I claim as my invention:

1. In an automatic variable speed transmission, a hydraulic clutch of the Fottinger type having a driving element secured to the shaft of a prime mover, and two driven elements through which the fluid is successively impelled, combined with a main shaft, a tail or driven shaft, and planetary gearing mounted on a carrier, the first driven element coupled to the main shaft through a one-way clutch, a sun gear on the main shaft meshing with the planetary gear, a band controlled brake drum coupled to the carrier through a one-way clutch, a torque spider secured to a sleeve having a sun gear meshing with the planetary gear, adapted to drive the tail shaft at low speed, the second driven element having a sleeve journalled on the main shaft, a sun gear on the sleeve meshing with the planetary gear, adapted to produce second speed, and means to couple the carrier to the tail shaft to produce direct drive.

2. In an automatic variable speed transmission, a hydraulic clutch of the Fottinger type having a driving element secured to the shaft of a prime mover, and two driven elements through which the fluid is successively impelled, combined with a main shaft, a tail or driven shaft, and planetary gearing mounted on a carrier, the first driven element coupled to the main shaft through a one-way clutch, a sun gear on the main shaft meshing with the planetary gear, a band controlled brake drum coupled to the carrier through a one-way clutch, a torque spider secured to a sleeve having a sun gear meshing with the planetary gear, the second driven element having a sleeve carried gear meshing with the planetary gear and a centrifugal clutch mounted on an extension to the tail shaft adapted to couple with the carrier of the planetary gear.

3. In an automatic variable speed transmission, a hydraulic clutch of the Fottinger type having a driving element secured to the shaft of a prime mover, and two driven elements through which the fluid is successively impelled, combined with a main shaft, a tail or driven shaft, and planetary gearing mounted on a carrier, the first driven element coupled to the main shaft through a one-way clutch, a sun gear on the main shaft meshing with the planetary gear, a band controlled brake drum coupled to the carrier through a one-way clutch, a torque spider secured to a sleeve having a sun gear meshing with the planetary gear, the second driven element having a sleeve journalled on the main shaft, a sun gear on the sleeve meshing with the planetary gear and a centrifugal clutch mounted on an extension to the tail shaft comprising a series of pins, weights pivoted thereon, slots in the weights, expanding toggles in the slots, a disc clutch between the extension and the carrier adapted to be closed by the toggles when the speed of rotation swings the weights outwards.

4. In an automatic variable speed transmission, a hydraulic clutch of the Fottinger type having a driving element secured to the shaft of a prime mover, and two driven elements through which the fluid is successively impelled, combined with a main shaft, a tail or driven shaft, and planetary gearing mounted on a carrier, the first driven element coupled to the main shaft through a one-way clutch, a sun gear on the main shaft meshing with the planetary gear, a band controlled brake drum coupled to the carrier through a one-way clutch, a torque spider secured to a sleeve having a sun gear meshing with the planetary gear, the second driven element having a sleeve journalled on the main shaft, a sun gear on the sleeve meshing with the planetary gear and a centrifugal clutch mounted on an extension to the tail shaft comprising a series of pins, weights pivoted thereon, inward extensions to the weights adjacent their pivot pins, embracing the outer ends of the spider, slots in the weights, expanding toggles in the slots, a disc clutch between the tail shaft extension and the carrier adapted to be closed by the toggles when the speed of rotation swings the weights outwards.

5. In an automatic variable speed transmission, a hydraulic clutch of the Fottinger type, having a driving element secured to a prime mover, two driven elements through which the fluid is successively impelled, combined with transmission mechanism in such a way that the first driven element operates the low speed drive through the transmission mechanism, the second driven element operates the second speed drive through the transmission mechanism, and a mechanical clutch, said mechanical clutch having a joint control comprising a centrifugal clutch operated by pivoted weights and means to control the centrifugal action by the torque applied through the transmission mechanism, said clutch adapted to cut out the operation of the transmission mechanism and provide a direct drive.

6. In an automatic variable speed transmission, a hydraulic clutch of the Fottinger type having a driving element secured to the shaft of a prime mover, and two driven elements through which the fluid is successively impelled, combined with a main shaft, a tail or driven shaft, and planetary gearing mounted on a carrier, the first driven element coupled to the main shaft through a one-way clutch, a sun gear on the main shaft meshing with the planetary gear, a band controlled brake drum coupled to the carrier through a one-way clutch, a torque spider secured to a sleeve having a sun gear meshing with the planetary gear, the second driven element having a sleeve journalled on the main shaft, a sun gear on the sleeve meshing with the planetary gear and means to couple the carrier to the tail shaft, the carrier having a sleeve with a sun gear, the extension of the tail shaft having a series of pins journalling a series of gear meshing with the sun gear of the carrier sleeve, a brake drum band controller, journalled on the tail shaft, having an annulus meshing with the gear on the tail shaft extension.

7. In a variable speed transmission a fluid clutch of the Fottinger type having a driving element and two driven elements through which the fluid is successively impelled, combined with transmission mechanism to a tail shaft, including a planetary gear in a carrier and a mechanical clutch between the carrier and the tail shaft and including an actuator responsive to tail-shaft speed, whereby the first driven element operates the tail shaft at low speed through the planetary gear, the second driven element operates the tail shaft at second speed through the planetary gear, and the combined driven elements acting as a unit operates the tail shaft in a direct drive through the planetary gear, the carrier and the mechanical clutch.

8. In a variable speed transmission, a fluid coupling of the Fottinger type having a driving element and two driven elements through which the fluid is successively impelled, combined with transmission mechanism to a tail shaft including a planetary gear and a shaft from the first driven element to the planetary gear whereby the tail shaft is operated at low speed, a sleeve journalled on the shaft coupled to the second driven element which operates the tail shaft at second speed, combined with means including an actuator responsive to tail-shaft speed to couple said driven elements through the planetary gearing, the sleeve, and shaft, whereby a direct drive of the tail shaft is obtained by driven elements coupled and acting as a unit and the drive is through the second-mentioned shaft.

9. In an automatic variable speed transmission, a hydraulic clutch of the Fottinger type, having a driving element driven by a prime mover, two driven elements through which the fluid is successively impelled, combined with a main shaft, a tail shaft, and planetary gearing mounted on a carrier and a centrifugal clutch between the carrier and the tail shaft, including means whereby the first driven element coupled to the tail shaft through the main shaft and planetary gear is adapted to drive the tail shaft at low speed, the second driven element coupled to the tail shaft through the planetary gear is adapted to drive the tail shaft at second speed, the combined driven elements coupled to the tail shaft through the planetary gear carrier by centrifugal clutch forming a unit, is adapted to drive the tail shaft at high speed or direct drive.

10. A speed-change gearing comprising, a first sun gear, a second sun gear of larger diameter than the first sun gear, a third sun gear of larger diameter than the first sun gear, an integrated group of planetary gears meshing with said sun gears, a carrier for said planetary gear group rotatable about the axis of the sun gears, means obstructing rotation in one direction only of said carrier, means for applying driving torque to the first sun gear, means for applying driving torque to the second sun gear, a tail shaft, a speed-sensitive element revolvable about the axis of the sun gears, a carrier for said speed-sensitive element connected with the tail shaft and rotatable about the axis of the sun gears, a friction clutch interposed between said last-mentioned carrier and the first-mentioned carrier and operated by said speed-sensitive element in clutch-activating position to clutch said two carriers together, and a connection between the third sun gear and the speed-sensitive element acting to restrain clutch-activating movement of the speed-sensitive element in accordance with the relation of input torque applied to the third sun gear and load-resistance torque applied to the tail shaft.

11. Apparatus of the character specified in claim 10 including a fluid coupling for the application of driving torque to the first sun gear.

12. Apparatus of the character specified in claim 10 including a fluid coupling comprising two torque delivery elements, one connected to the first sun gear and the other connected to the second sun gear.

13. Apparatus of the character specified in claim 10 and including a planetary gear mounted to be revolved with the tail shaft, a gear carried by the carrier of the planetary group of gears and meshing with said tail shaft planetary gear, another gear meshing with said tail shaft planetary gear throughout its planetary movements, and means by which said last-mentioned gear may be held stationary.

14. Apparatus of the character specified in claim 10, and including manually controlled means for locking the speed-sensitive elements against response to speed changes, means by which the second sun gear may be held against rotation, and means rendering ineffective application of input torque to the second sun gear.

15. A speed-change gearing comprising, a first sun gear, a second sun gear of larger diameter than the first sun gear, a third sun gear of larger diameter than the first sun gear, an integrated group of planetary gears meshing with said sun gears, a carrier for said planetary group, a liquid coupling having an impeller and two runners through which the coupling liquid will circulate in series relative to the impeller, a one-way forward driving connection between the first runner of the liquid coupling and the first sun gear, means by which reverse rotation of the carrier of the planetary group may be blocked, a driving connection between the second sun gear and the second runner of the liquid coupling, a tail shaft coaxial with the sun gears, a speed-sensitive element revolvable about the axis of the sun gears, a carrier for said speed-sensitive element connected with the tail shaft and rotatable about the axis of the sun gear, a friction clutch interposed between said last-mentioned carrier and the first-mentioned carrier and operated by said speed-sensitive element in clutch-activating movement of the speed-sensitive element in accordance with the relation of input torque applied to the third sun gear and load-resistance torque applied to the tail shaft.

16. Apparatus of the character specified in claim 15 and including means for blocking speed-response of the speed-sensitive elements, means for blocking rotation of the second sun gear, and means for disconnecting the second sun gear from the second runner of the coupling.

17. Apparatus of the character specified in claim 15 and including a gear carried by and coaxial with the planetary gear carrier, a planetary gear carried by the tail shaft and meshing with said last-mentioned gear, a gear meshing with said last-mentioned planetary gear throughout its planetary movement, and means by which said last-mentioned gear may be restrained against rotation.

18. A speed-change transmission gearing comprising, a power-receiving sun gear, a power-delivery sun gear, and a tail shaft coaxial with said sun gears, a unified planetary gear group meshing with said two sun gears, a carrier for said planetary gear rotatable about the common axis of the sun gears and tail shaft, a centrifugal weight movably mounted on and revolved by the tail shaft, a connection between said power-delivery sun gear and said centrifugal weight acting in one direction to restrain centrifugal response by said weight, friction clutching means interposed between the tail shaft and the carrier of the planetary gear, means controlled by said weight to activate said clutch when said weight is in its outer position, and means by which power may be applied to rotate the power-receiving sun gear.

19. Apparatus of the character specified in claim 18 and including a second power-receiving sun gear coaxial with said first power-receiving sun gear and meshing with the planetary group, and means by which rotating power may be applied to said second power-receiving sun gear independent of the first sun gear.

20. Apparatus of the character specified in claim 15 and including means for blocking speed response of the speed sensitive elements, and means for blocking rotation of the second sun gear.

21. A speed-change gearing comprising, a first input sun gear, a second input sun gear, an output sun gear, all of which are coaxial, an integrated group of planetary gears meshing with said sun gears, a rotary carrier for said planetary gears coaxial with said sun gears, a fluid coupling comprising an impeller and two runners arranged in series relative to said impeller, a one-way driving connection between the first of said runners and the first input sun gear, a driving connection between the second of said runners and the second input sun gear, and means for selectively blocking rotation of the second input sun gear independent of said second runner.

22. A speed-change gearing comprising, a first input sun gear, a second input sun gear, an output sun gear, all of which are coaxial, an integrated group of planetary gears meshing with said sun gears, a carrier for said planetary gears coaxial with said sun gears, means for selectively connecting the output gear with said carrier, a fluid coupling comprising an impeller and two runners arranged in series relative to said impeller, a one-way driving connection between the first of said runners and the first input sun gear, a driving connection between the second of said runners and the second input sun gear, and means for selectively blocking rotation of the second input sun gear independent of said second runner.

23. In a variable speed transmission having a hydraulic clutch with a driving element and two driven elements through which the fluid is successively impelled, a tail shaft, a one-way speed-reducing gear train connecting the first of said driven elements with the tail shaft, a speed-reducing gear train of higher ratio connecting the second of said driven elements with the tail shaft, combined with means responsive to a predetermined difference between input torque and load torque applied to the tail shaft by which said two elements and their associate gear trains may be locked for a unit effect on the tail shaft.

24. A speed-change gearing comprising, a primary input sun gear, a secondary input sun gear, an output sun gear, a tail shaft, a differential planetary gear unit meshing with said sun gears, a carrier for said planetary unit rotatable about the axis of the sun gears, releasable means for blocking rotation of said carrier in one direction, a clutch for connecting said carrier and tail shaft, a speed-sensitive actuator for said clutch responsive to tail shaft speed, a driving connection between said actuator and tail shaft, said connection being responsive during forward vehicle movement to a differential between input torque and tail shaft torque.

25. The combination with an epicyclic gearing comprising two coaxial input sun gears, a coaxial ouput gear, a planet unit gear meshing with said three gears, a coaxial tail shaft, a unit carrier coaxial with the input gears and tail shaft, and a clutch for selectively coupling said carrier and tail shaft, of a centrifugally sensitive actuator for said clutch carried by the tail shaft, a connection between the output gear and said actuator sensitive to relative angular movement between output gear and tail shaft whereby forward torque on the output gear opposes clutch actuating movement of the actuator, and controllable means independent of the input gears for blocking response of said actuator to variations in speed of the tail shaft.

26. A speed and torque sensitive clutch comprising a rotary input element, a coaxial rotary output element, a weight pivoted on the output element on axis eccentric to the axis of rotation of said element, a connection between the input element and said weight acting to swing said weight about its pivotal axis upon relative rotation between the input and output elements, a rotary element coaxial with said input and output elements, clutching means interposed between said last-mentioned rotary element and the output element, and a toggle carried by said weight between said clutching means and output element to alternately activate and release said clutching means by opposite swinging movements of said weight about its pivotal axis.

27. A speed and torque sensitive clutch comprising a rotary input element, a coaxial rotary output element, a weight carried by said output element eccentric to the axis of said output element and movable from and toward the axis of said output element, a connection between the input element and said weight acting to move said weight transversely of the common axis of the input and output elements upon relative movement between the input and output elements, a rotary element coaxial with said input and output elements, clutching means interposed between said last-mentioned rotary element and the output element, and a toggle carried by said weight between said clutching means and the output element to alternately activate and release said clutching means by opposite movements of said weight transversely of the common axis of the input and output elements.

WILLIAM A. DUFFIELD.